Sept. 1, 1959 P. C. GANDERTON 2,902,571
SWITCH CONTACTS
Filed June 7, 1957 2 Sheets-Sheet 1

INVENTOR
Peter Clifton Ganderton
BY
Kemon and Palmer
ATTORNEYS

INVENTOR
Peter Clifton Ganderton
BY
Kemon and Palmer
ATTORNEYS

United States Patent Office
2,902,571
Patented Sept. 1, 1959

2,902,571

SWITCH CONTACTS

Peter C. Ganderton, Poole, Dorset, England, assignor to Sydney S. Bird & Sons Limited, Poole, Dorset, England, a British company Application June 7, 1957, Serial No. 664,374
Claims priority, application Great Britain April 5, 1957
8 Claims. (Cl. 200—166)

This invention relates to switch contacts.

In radio, television and other equipment electrical components are often mounted on boards of insulating material, which boards may also constitute a support for a printed circuit. It is then sometimes desired to provide a switch contact at the edge of the board, the contact being connected to a component on the board or a portion of a printed circuit on the board, enabling the component or the circuit to be connected to and disconnected from a further switch contact.

Thus it may be required to move the board between two positions, in one of which the contact on the edge of the board presses against a resilient contact and in the other of which it does not touch the resilient contact. Alternatively the board may be fixed and a resilient contact or contacts be moved into and out of engagement with the contact on the edge of the board.

It is one object of the present invention to provide an improved switch contact member suitable for mounting on an insulating board carrying a printed circuit and/or component and providing a contact surface at an edge of the board.

According to the present invention, a switch contact consists of an elongated resilient metallic member hooked at one end, cranked through approximately 90° at the other end in the same direction as the hook on the said one end, and bowed along a region intermediate the two ends.

In manufacture the switch contact may be bent from a strip-like piece of metal of oval cross-section which may be bowed readily only in a plane perpendicular to the major axis of the oval.

In fitting a contact according to the invention to a board the hooked end may be fitted round the edge of a board and the cranked end spring into a suitably placed aperture in the board. A locating nick may be made in the edge of the board before fitting the contact, the hooked end then engaging in this nick. The locating nick prevents the hooked end from moving sideways along the edge of the board.

Figure 1:
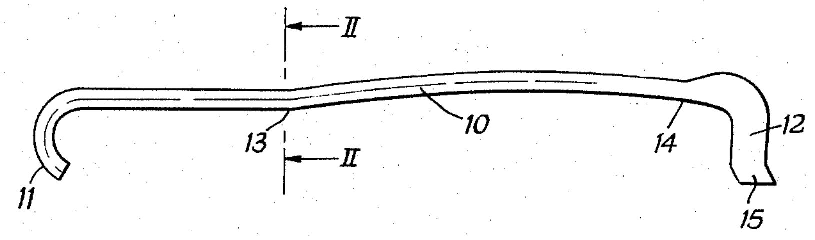
Figure 2:
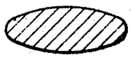
Figure 3:
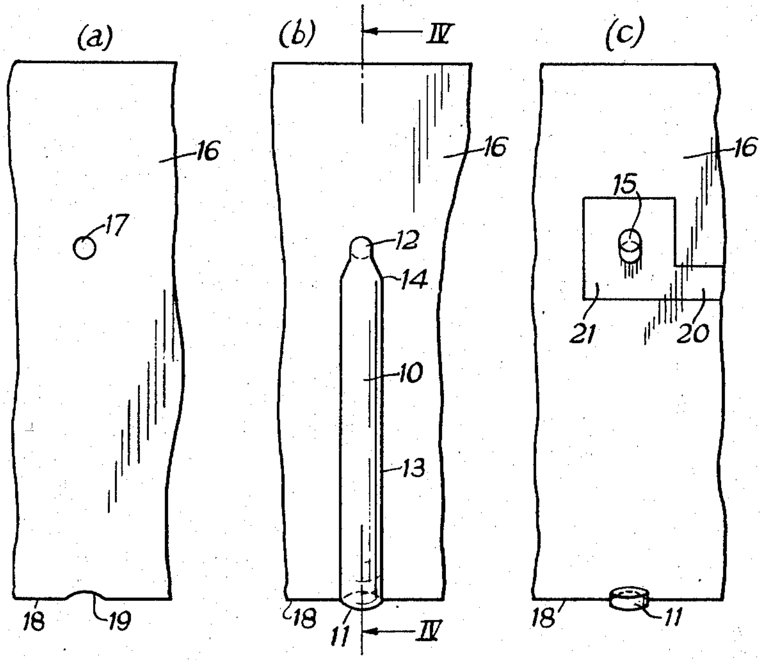
Figure 4:
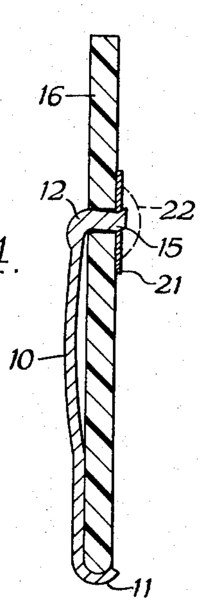
Figures 5, 6:
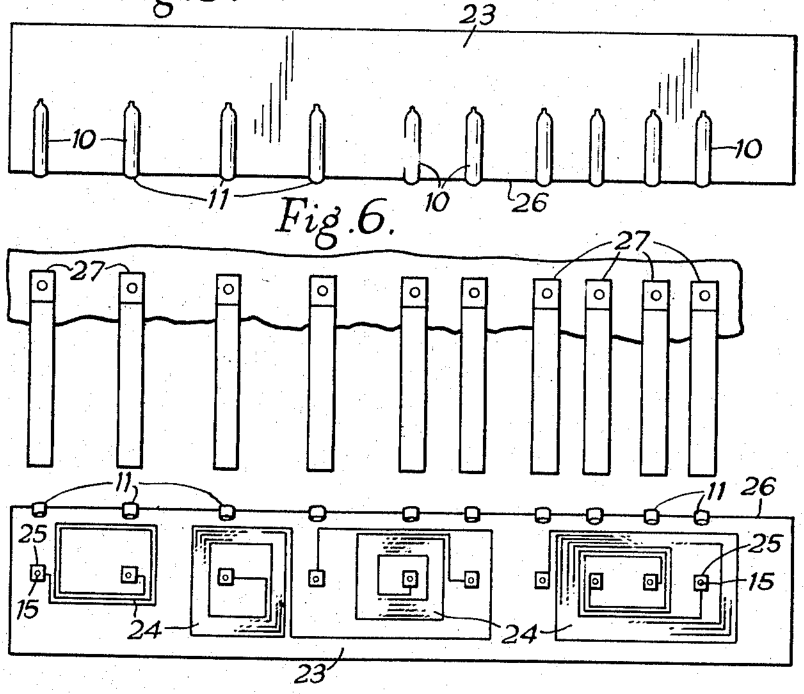

The invention will now be described, by way of example, with reference to the accompanying drawings, in which, Fig. 1 is a side elevation to an enlarged scale of one embodiment of the invention, Fig. 2 is a section to further enlarged scale along the line II—II in Fig. 1, Fig. 3 is a plan to an enlarged scale of a board having switch contacts mounted thereon, Fig. 4 is a cross-section substantially to scale along the line IV—IV in Fig. 3, and Figs. 5 and 6 are plans from above and below respectively of a board supporting flat spiral inductors for use in a television turret tuner, with switch contacts mounted on the board and connected to the ends of the inductors.

In Fig. 1 an elongated, resilient, metallic member 10 of brass is hooked at one end 11, and cranked through approximately 90° at the other end 12, the directions in which the two ends are cranked and hooked respectively being the same as shown.

In a region between points 13 and 14 intermediate the two ends of the member the member is bowed in a direction opposite to that in which the two ends are cranked and hooked respectively as shown.

The whole of the member 10 except the cranked end 12 is of oval cross-section, that is a cross-section of curved profile in which one axis is greater than the other as shown, for example, in Fig. 2.

The minor axis of the cross-section is, over the bowed region, in the direction of bowing and hence bowing is facilitated whilst maintaining rigidity in the direction of the major axis.

Furthermore this profile of cross-section provides a suitable contact surface on the outer surface of the hooked end.

The cranked end is preferably of circular cross-section for engagement in a circular aperture.

The tip 15 of the cranked end 12 is further cranked as shown in the opposite direction to the portion 12. The tip 15 is cranked through an angle which is small compared with 90°. In the embodiment shown the tip 15 is cranked through 30°.

Referring to Fig. 3 a board 16 of insulating material is shown at (*a*) prepared to receive a switch contact such as that shown in Fig. 1. An aperture 17 is drilled through the board at a suitable distance from one edge 18 of the board and a nick 19 is formed in the edge 18 opposite the aperture 17.

A switch contact is shown fitted on the board at (*b*). The cranked end 12 passes through the aperture 17 in the board and the hooked end 11 fits round the edge 18 of the board, being located by the nick 19. At (*c*) is shown a view from the underside of the board with the contact fitted. The cranked end 12 projects through the board which is here shown with a printed circuit conductor 20 terminating in an enlarged end portion 21 round the aperture 17. The tip 15 of the cranked end 12 is soldered to this end portion 21 of the printed circuit conductor.

In the mounting the contact member in the position shown in Fig. 3 (*b*) and (*c*) the hooked end is first of all hooked round the edge 18 of the board 16 the hooked end being located by the nick 19. The cranked end is then sprung into the aperture 17 which is spaced from the edge 18 by a distance such that when the cranked end is sprung into position in the aperture 17 the contact member 10 is held firmly in position by tension therein.

The cranked tip 15 of the end 12 serves to maintain the cranked end in position as shown in cross-section in Fig. 4. It will be seen in Fig. 4 that the cranked tip engages with the underside of the board and hence removal of the contact member can be effected only by further bowing of the bowed region.

The broken line 22 in Fig. 4 represents a dome of solder connecting the cranked end 12 of the contact member 10 with the enlarged end portion 21 of the printed circuit conductor 20.

Referring now to Figs. 5 and 6 these are plan views respectively from above and below of a plurality of inductors and associated contact members for mounting in a turret tuner for television receiving apparatus.

Thus a board 23 supports five flat inductive spirals 24. These are made from copper foil by a circuit printing technique, and each end of each inductor is terminated by a small square 25 of copper foil. A hole is drilled or punched through the centre of each square 25 and the board 23 and a nick made in one edge 26 of the board 23.

Ten contact members 10, such as described with reference to Fig. 1, are fitted, each with the hooked end 11 in one of the nicks in the edge 26 of the board 23 and the cranked end 12 sprung through the corresponding hole. The cranked tips 15 of each cranked ends 12 pass through the holes in the board 23 and are soldered to the squares of copper foil 25.

Thus connection is made from the two ends of each of the inductors 24 to the edge 26 of the board 23. In a television turret tuner a plurality of such boards are mounted in a turret with the edges 26 directed peripherally outwards. The outer surfaces of the hooked ends 11 may be brought into contact with a set of ten fixed contacts, shown diagrammatically as 27 in Fig. 6. On rotation of the turret successive sets of coils on boards 23 may be connected into a tuning circuit to which the fixed contacts 27 are connected.

Whilst the invention has been described specifically with reference to boards mounting printed conductors and components, contacts according to the invention may be mounted on other insulating members. For example contacts may be mounted on a moulded plastic member with a hole in one edge to engage the tip of the hooked end 11 and a cavity a suitable distance from this edge of the member to receive the cranked end 12. Connection may be made from the cranked end 12 to electrical components other than printed conductors or components.

I claim:

1. A preformed electrical connecting member useful as a switch contact or the like and designed to be self-supportingly mounted in tension on an insulating base between an aperture in said base and an edge portion thereof, comprising: an elongated resilient metallic member hooked at one end, cranked through approximately 90° at the other end in the same direction as the hook on the said one end, and bowed along a region intermediate the two ends.

2. A switch contact according to claim 1, wherein the cross-sectional shape of the bowed region of the said member is oval.

3. A switch contact according to claim 1, wherein the cross-sectional shape of the hooked end of the said member is oval.

4. A switch contact according to claim 1, wherein the cross-sectional shape of the cranked end of the said member is substantially circular.

5. A switch contact according to claim 1, wherein the tip of the cranked end is further cranked through an angle which is small compared with 90°.

6. A switch contact according to claim 1, wherein the direction of bowing in the bowed region is opposite to the direction in which the two ends are hooked and cranked respectively.

7. An electrical circuit component comprising: an insulating base; at least one printed circuit carried by said base; means defining an aperture in said base, aligned with a terminal portion of said printed circuit; at least one connecting member which comprises an elongated resilient metallic member hooked at one end, cranked through approximately 90° at the other end in the same direction as the hook on the said one end, and bowed along a region intermediate the two ends, said member having its cranked end inserted through said aperture and connected to said circuit terminal and its hooked end engaging over an edge of said base, the distance of said aperture from said edge being such that said connecting member is in tension.

8. A printed circuit or component according to claim 7, wherein at the point of engagement between the hooked end of the contact member and the board the board is provided with a nick which locates the hooked end of the contact member.

References Cited in the file of this patent

UNITED STATES PATENTS 2,796,499 Barden et al. ............ June 18, 1957